July 20, 1971 A. RICCI 3,594,194
PROCESS FOR TREATMENT OF BASIL AND PRODUCTS THEREOF
Filed May 18, 1970
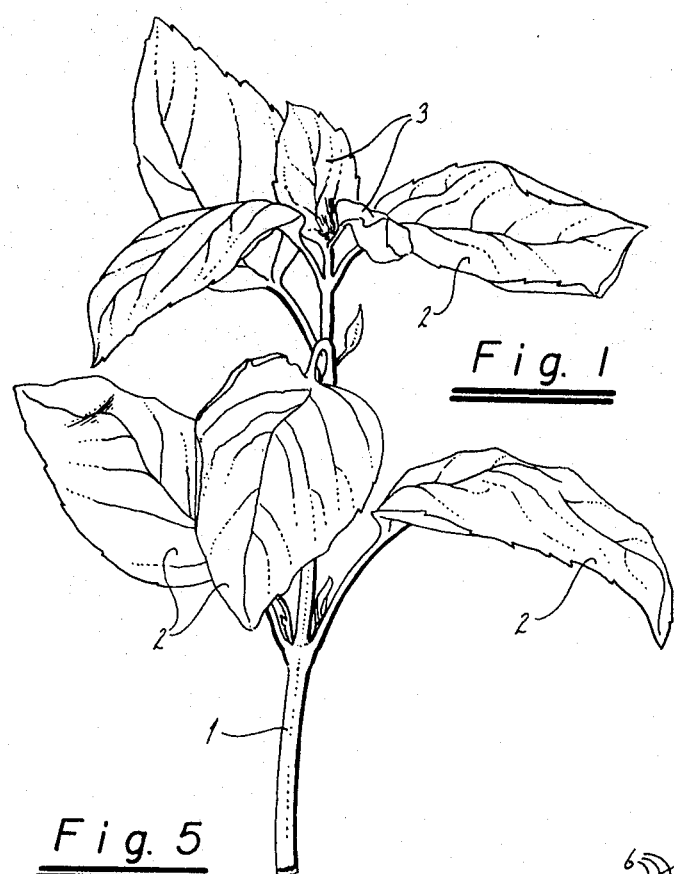
Fig. 1
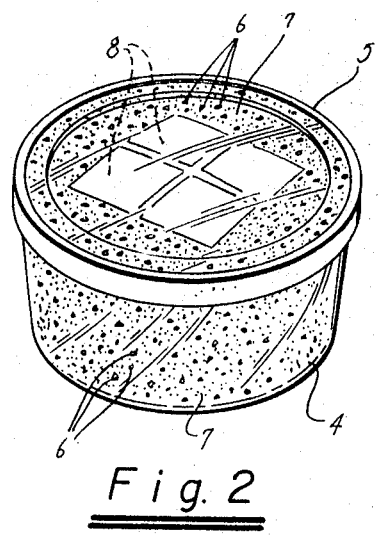
Fig. 2
Fig. 5
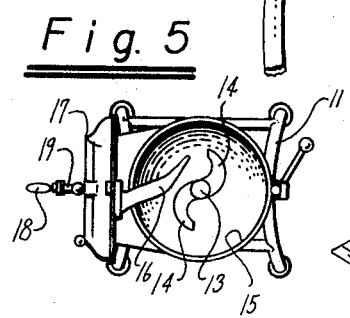
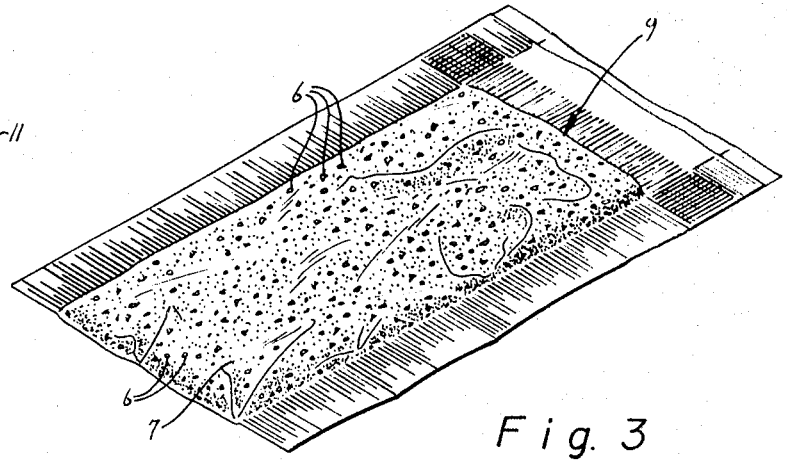
Fig. 3
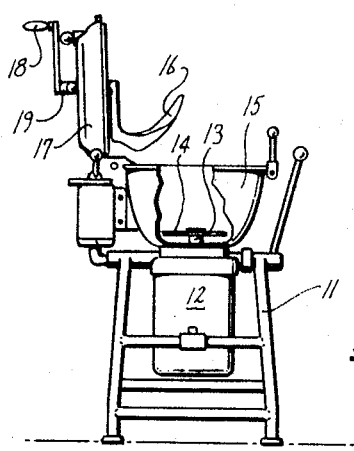
Fig. 4
INVENTOR.
Angelo Ricci
BY
Attorney

United States Patent Office 3,594,194
Patented July 20, 1971

3,594,194
PROCESS FOR TREATMENT OF BASIL AND PRODUCTS THEREOF
Angelo Ricci, 2790 24th St., San Francisco, Calif. 94110
Filed May 18, 1970, Ser. No. 38,116
Int. Cl. A23l 1/22, 1/26
U.S. Cl. 99—140          15 Claims

ABSTRACT OF THE DISCLOSURE

Process for assuring the retention of the natural green color and flavor of basil leaves which includes heating the leaves by steam or hot water, quenching the leaves in cold water, and cutting the leaves into small particles which will remain in suspension when the basil particles are blended with other ingredients to form a flavoring sauce.

BACKGROUND OF THE INVENTION

The use of the herb known as basil or sweet basil and botanically as "Ocimun basilicum" as a flavoring or condiment in food preparations has been known since biblical times. Its practical application to modern food preparations and products has however, been always accompanied by many problems, thus limiting its wider application.

In addition to its distinctive flavor, basil has a beautiful natural green color which adds considerably to the appearance of finished food products. Unfortunately, however, with heretofore known methods of use and application of the herb, the beautiful green color disappears or deteriorates on standing of the product for any length of time and the flavor loses its exotic character also. The mysteries connected with this phenomean are lost somewhere in the complexity of organic chemistry and have heretofore defined solution or even explanation.

The problem has become more acute in recent years with the growth of prepared sauces and flavorings which are packaged and sold to super-markets and other stores, either in a refrigerated or other condition. More particularly, the problem is encountered in sauces and flavorings used in connection with macaroni and spaghetti dishes, including noodles of various kinds, raviolis, tagliarini, and other foods generically known as "paste" or "pasta" for which Italian cuisine has long been noted. The desirability of maintaining the green color, as well as distinctive flavor, is especially important in connection with dishes of this class.

A product known as "Pesto" which comprises basil ground up and mixed with other ingredients has been used for this purpose for many years. This, however, as well as similar products, still has all of the disadvantages enumerated above, particularly in its loss of color and flavor as well as its ability to retain the suspension of the basil in the rest of the liquid which in turn contributes to the other disadvantages enumerated above.

SUMMARY

I have discovered that by treating the fresh leaves of the basil plant after the manner of my invention I am able to overcome all of the aforementioned problems and disadvantages. More specifically, my process comprises novel heat treatment and blending operations on the basil leaves to produce their unusual properties. I first subject the raw leaves to the scalding action of boiling water for approximately one to two minutes or to the action of pressurized steam for a matter of fifteen to sixty seconds. I then plunge the leaves instantly into ice cold water where they are permitted to remain for a few minutes. I then strain the leaves and subject them to a special cutting action for reducing them to particles of relatively small size.

When using the pressurized steam process I utilize a special tray which gathers basil flavored condensate which has leached out from the leaves under the action of the steam and then reblend it with other ingredients to form a finished product as set forth more fully below.

I may then package my thus heat treated and processed small particles of basil leaves in a refrigerated or frozen state or subject them to a further freeze-drying process before final packaging. In any case, the leaves are now ready as a commercial product for use as in preparing various food dishes or for further processing into finished food sauces.

In the latter case I may first introduce various ingredients such as water, oil, galic, salt, etc., into a suitable machine which performs a combined mixing and cutting operation and subject this mixture to a high speed mixing action. I then introduce my heat treated basil leaves into the same machine and subject them to a further combined mixing and cutting action.

Other ingredients may be added later if desired, the mixing continued and the finished product packaged and placed under refrigeration, frozen, or freeze-dried, all as described more fully below.

DESCRIPTION OF THE DRAWING

FIG. 1 is a reproduction of the stem and leaves of a typical basil plant.

FIG. 2 is a typical example of one of the finished products of my invention in a plastic container.

FIG. 3 is a typical example of a finished product of my invention in a plastic envelope.

FIG. 4 is a vertical elevation partly in section of a typical cutting mixing machine for use in connection with my invention.

FIG. 5 is a top view of the machine of FIG. 4.

DESCRIPTION OF PREFERRED EMBODIMENTS

Referring now to the drawing, there is seen in FIG. 1 a reproduction of a typical stem and typical leaves of a basil plant including the stem 1, the large leaves 2, and the smaller leaves 3. The leaves, as they are naturally grown from seed, are a brilliant green in color. The plant is cultivated widely throughout the United States. The plant itself may grow to a height of a foot or more and is sometimes also referred to as "sweet basil" or by its botanical name of genus "Ocimun basilicum."

As one embodiment of my invention I take a number of leaves varying in size from approximately one to three inches in length by one to two inches in width and dip them into boiling water. The number of leaves utilized will depend on the quantity of finished product which I want to manufacture. I thus subject them to a scalding action for approximately one minute.

Immediately after the foregoing step I quench the leaves in ice cold water for approximately one minute. The actual temperatures, of course, will be that of boiling water at atmospheric pressure which is approximately 212 degrees Fahrenheit; and the temperature of melting ice or 32 degrees Fahrenheit.

Of course, suitable vessels are used in my process and these depend on the quantity of basil leaves that it is desired to process at one time, the basic process not being affected thereby.

I next pour the ice cold liquid containing the leaves through any suitable strainer to separate them from the liquid and I have now caught the leaves in a certain state as a result of the foregoing treatment process which stabilizes their color retention, as well as their flavor and aroma.

I next place the leaves so processed in a suitable cutting machine in order to cut them up to suitable size. The latter machine may take the form of what is commonly known as a "vertical cutter" or "cutter-mixer" which is equipped with rapidly rotating blades which cut my processed leaves into particles ranging in size from approximately $\frac{1}{32}$ of an inch to $\frac{1}{8}$ of an inch in maximum dimensions.

Such a machine may be seen in FIG. 4 which is a vertical elevation, partly in section, and in FIG. 5 which is a top view.

In FIGS. 4 and 5 there is seen a frame 11 on which is mounted motor 12. Shaft 13 connects with cutter blades 14 which may be caused to revolve at various speeds up to as high as 3500 r.p.m.

Cutter blades 14, which may be of propeller type, are mounted inside bowl 15 into which the basil leaves or the basil leaves plus a mixture of flavoring ingredients is introduced as described below.

A baffle 16 positioned on hinged cover 17 may be utilized also when cutter blades 14 are in operation. Hinged cover 17, of course, is closed when in operation and baffle 16 may be caused to oscillate around the inside of bowl 15 by means of handle 18 which is connected to baffle 16 through shaft 19. This latter action serves to move the leaves away from the inner surface of bowl 15 and into the path of cutter blades 14.

The cutting action of blades 14 is an important part of my invention in that I avoid crushing or smashing of the leaves which might destroy their flavor through expelling juices and instead I provide a high speed clean cutting action.

At this point, when dealing with the basil leaves only I may remove them from the bowl 15, package them in suitable containers under refrigeration or subject them to freezing or a freeze-drying operation, in any of which forms they may be placed on the market for further use in flavoring or similar operations.

As an independent step in my process which I may perform prior to the heat treatment and cutting described above, or afterwards, I prepare a mixture which comprises the matrix for dispersion of my processed basil leaves and contains ingredients for a finished sauce. For this I may mix a suitable edible oil, such as olive oil, garlic in powdered or fresh form, salt, water, butter and cheese and subject these to violent agitation in a suitable mixer such as shown in FIGS. 4 and 5.

I continue this agitation until the compound forms an emulsion which resembles milk in color and viscosity.

I then introduce my processed leaves described above into the compound containing the above or similar ingredients and again subject them to violent agitation for a period of approximately one to two minutes at room temperature. The time and intensity of this step in my process is sufficient to cause a complete suspension of my small leaf particles of basil in the above compound. The latter is normally white in color but the introduction of my now stabilized green basil particles gives it a definitely green appearance, and since this process insures that my leaf particles remain in suspension in the mixture and not settle out, the green color predominates and retains its color characteristics indefinitely.

In an alternate embodiment of the above process which I term my "steamed" method, I start off by preparing a mixture of my ingredients, such as water, oil, garlic, salt, etc., and place them in my combined "mixer-cutter" as described above.

I next place my basil leaves into a suitable tray which may be of stainless steel and place the latter into a steam oven where I subject the leaves to the action of saturated steam at approximately 15 to 20 pounds per square inch or the equivalent of approximately 250 to 300 degrees Fahrenheit for approximately one to two minutes depending on the quantity of basil used.

I next remove the leaves and suddenly quench them in ice cold water, strain, and place them in the "mixer-cutter" as in the previous method described above.

The steaming process acts to form a liquor in the trays which contains a concentrated liquid of basil flavor which has leached out of the leaves. I add this liquid to the contents of the mixer described above and then proceed with the mixing, cutting and blending step described in the previous embodiment.

Addition of butter and grated cheese if desired and continued mixing completes the operation.

I may then package my finished product in a transparent plastic container, as best seen as 4 in FIG. 2, and cover it with a removable plastic cover 5. The small leaf particles of chopped-up basil leaves are seen at 6 and remain in suspension in the liquid matrix of milky-like flavoring 7. As an added feature I may introduce squares of butter 8 into the container 4 to improve the application of my invention as set forth below.

To provide for smaller proportions I may package my product in a transparent plastic envelope or bag 9, best seen on FIG. 3 which will still retain the characteristics and features of my product.

For most applications I then place my container shown in FIG. 2 or the one in FIG. 3 under refrigeration until it is ready for use.

Instead of a refrigerated or frozen product I may also subject my finished product to a freeze-drying operation and market it as such.

EXAMPLE

Below is a typical example of a formula which I may use and have found very successful for typical applications, although my invention is evidently not limited to this as set forth below.

One pound of basil leaves, heat treated and processed as described above;
One ounce of salt;
Six ounces of oil (olive oil preferred, but other edible oils satisfactory);
Three ounces of water;
One-half ounce of fresh garlic or $\frac{1}{10}$ ounce of powdered garlic;
Ten ounces of cheese (Parmesan preferred, but others suitable);
One-half pound of butter (optional).

The above composition when processed as set forth above will produce approximately 40 liquid ounces of finished product. Of course, this may be varied to suit individual needs without departing from my basic invention. For example, the illustration of FIG. 2 represents a typical container for a 4-ounce batch of my product sufficient to serve approximately four people with a normal portion of typical paste. The illustration FIG. 2 is approximately a 1½-ounce batch which is usually sufficient for an individual serving. Of course, restaurant or institutional users would prefer to use larger batches in the interest of economy and efficiency.

As a further typical example of the application of my invention, I may first heat to boiling at a predetermined length of time a batch of approximately one pound of a paste product such as macaroni. I may then place my plastic container illustrated on FIG. 2 into hot tap water for a period of approximately 5 to 10 minutes to insure thorough heating of the contents, as well as melting of the butter with that in view. I then remove the cover 5 from container 4 and pour the contents over my paste product mixing it thoroughly with a spoon. It is then ready to serve with the addition of powdered Parmesan cheese or other ingredients as may be desired.

The important thing is that any product when produced as set forth above will always retain its beautiful green natural color and impart this to the food product upon which it is used. It will, moreover, retain the original natural flavor of the basil leaves blended into a compound with the other flavoring ingredients in the finished product.

Of course, my product may be used as a flavoring with dishes other than those characterized as pastes, as will now be evident to those skilled in the culinary art. The principal thing is that my product is able to impart a lasting and highly distinctive and superior flavor and appearance to almost any food product with which it is used. I have discovered that the results are truly unusual and in fact may be characterized as "Saybaritic" in nature.

I claim:

1. A process of treatment of fresh basil leaves comprising the steps:
   heating said leaves in hot water for a predetermined interval of time;
   quenching said leaves in cold water for a predetermined interval of time;
   removing said leaves from said cold water and subjecting said leaves to the action of rapidly rotating sharp cutting blades to reduce them to relatively small particles;
   subjecting said leaves to the process of refrigeration.

2. The process of claim 1 in which said leaves are heated in water to a temperature of approximately 212 degrees Fahrenheit for a period of approximately one minute and said leaves are quenched in water at a temperature of approximately 32 degrees Fahrenheit for approximately one minute.

3. The process of claim 2 including the additional step of subjecting said leaves to the process of freeze-drying.

4. A process of treatment of fresh leaves comprising the steps:
   placing said leaves on a suitable tray inside a steam oven;
   subjecting said leaves to the action of saturated steam at a pressure of approximately 15 to 20 pounds per square inch for approximately one to two minutes whereby a liquor is leached out of said leaves and into said trays;
   quenching said leaves in ice cold water;
   removing said leaves from said ice cold water and subjecting said leaves to the action of rapidly rotating sharp blades in a cutter-mixer to reduce them to relatively small particles;
   introducing said liquor which was previously leached out of said leaves into said mixer and continuing said rotating action until a thorough mixture is obtained;
   subjecting said mixture to the process of refrigeration.

5. The process of claim 4 including the additional step of subjecting said mixture to the process of freeze-drying.

6. A process for manufacturing a food flavoring product comprising the steps:
   heating fresh basil leaves in water at a temperature of approximately 212 degrees Fahrenheit for approximately one minute;
   quenching said leaves in water at a temperature of approximately 32 degrees Fahrenheit for approximately one minute;
   removing said leaves from said water and subjecting said leaves to the action of rapidly rotating blades in a cutter-mixer;
   introducing a composition comprising edible oil, water, salt, and garlic into said mixer;
   continuing the said action of said mixer until said leaves are thoroughly dispersed throughout said composition;
   subjecting the resultant dispersion to the process of refrigeration.

7. The process of claim 6 including the additional step of subjecting said dispersion to the process of freeze-drying.

8. The process of claim 6 in which said composition comprises in addition, butter and grated cheese.

9. A process for manufacturing a food flavoring product comprising the steps:
   placing fresh basil leaves on a suitable tray inside a steam oven;
   subjecting said leaves to the action of saturated steam at a pressure of approximately 15 to 20 pounds per square inch for approximately one to two minutes whereby a liquor is leached out of said leaves and into said tray;
   quenching said leaves in ice cold water;
   removing said leaves from said ice cold water and subjecting said leaves to the action of rapidly rotating blades in a cutter-mixer;
   introducing a composition comprising edible oil, water, salt, and garlic into said mixer;
   introducing said liquor which was previously leached out of said leaves into said mixer;
   continuing the said action of said mixer until said leaves are thoroughly dispersed throughout said composition;
   subjecting the resultant dispersion to the process of refrigeration.

10. The process of claim 9 including the additional step of subjecting said dispersion to the process of freeze-drying.

11. The process of claim 9 in which said composition comprises in addition butter and grated cheese.

12. A food flavoring composition comprising:
    edible oil, water, salt, garlic and finely cut-up particles of basil leaves;
    said leaves having been previously subjected to successive scalding, cold water quenching and cutting actions to produce said particles;
    said basil particles being thoroughly dispersed throughout said composition.

13. The product of claim 12 in which said composition includes in addition butter and grated cheese.

14. A food flavoring composition comprising:
    edible oil, water, salt, garlic, finely cut-up particles of basil leaves, and a basil liquor;
    said leaves having been previously subjected to a steaming action whereby said liquor was leached out of said leaves;
    said basil liquor having been added to other said ingredients;
    said leaves having been further subjected to cold water quenching and to cutting actions to produce said particles;
    said basil particles being thoroughly dispersed throughout said composition.

15. The product of claim 14 in which said composition includes in addition butter and grated cheese.

References Cited

UNITED STATES PATENTS 3,071,475  1/1963  Stohr _____ 99—140X

OTHER REFERENCES

W. V. Cruss, "Commercial Fruit and Vegetable Products," 2nd Edition, 66–68, McGraw-Hill, New York, 1938.

MORRIS O. WOLK, Primary Examiner

S. MARANTZ, Assistant Examiner

U.S. Cl. X.R.

99—144